United States Patent [19]

Lewandowski

[11] 4,245,157

[45] Jan. 13, 1981

[54] ELECTRON IRRADIATION METHOD FOR IMPROVING PERFORMANCE OF A RADIATION SENSOR

[75] Inventor: Robert S. Lewandowski, Amsterdam, N.Y.

[73] Assignee: General Electric Company, Schenectady, N.Y.

[21] Appl. No.: 25,014

[22] Filed: Mar. 29, 1979

[51] Int. Cl.³ .............................................. G01T 1/20
[52] U.S. Cl. ................................. 250/362; 250/369; 250/492 B
[58] Field of Search ............... 250/361 R, 483, 492 R, 250/492 B, 362, 369; 427/35, 64

[56] References Cited

U.S. PATENT DOCUMENTS

| 3,354,064 | 11/1967 | Letter | 250/492 B |
| 3,932,760 | 1/1976 | Inoue | 250/492 R |
| 4,039,699 | 8/1977 | Morimoto et al. | 250/492 B |

*Primary Examiner*—Davis L. Willis
*Attorney, Agent, or Firm*—Geoffrey H. Krauss; Marvin Snyder; James C. Davis

[57] ABSTRACT

A scintillation member, such as of thallium-doped cesium iodide and the like, of a radiation-responsive sensor, is irradiated by electrons to irreversibly change the phosphor material and decrease the hysteresis and afterglow responses of the sensor.

10 Claims, 4 Drawing Figures

ELECTRON IRRADIATION METHOD FOR IMPROVING PERFORMANCE OF A RADIATION SENSOR

BACKGROUND OF THE INVENTION

The present invention is directed toward radiation sensors and, more particularly, to a novel method for improving the hysteresis and excitation after-glow performance of a radiation-responsive sensor by electron irradiation of the radiation-converting phosphor used therein.

Sensors for detecting radiation flux, such as the x-ray flux detectors used in computed tomography systems, are known to the art. Such sensors may consist of a bar of a conversion material, such as thallium-doped cesium iodide (CsI:Tl), which acts to convert x-ray flux to optical photons, and a photon detector positioned adjacent to the bar of conversion material, for converting the optical photons into an electric current, which may be amplified and subsequently processed to determine the x-ray flux incident upon the conversion material bar of the radiation sensor. The phosphor utilized in such a scintillation detection system has been found to be subject to both (a) a hysteresis effect, i.e. a reversible change in the optical photon output of the scintillation phosphor, with time and under constant radiation excitation, and (b) the presence of a phosphorescent tail, or after-glow, from the phosphor after the cessation of impingent radiation convertible to optical photons. These phenomena result in errors between consecutive measurements of incident radiation flux in scintillation detector systems, especially when the incident radiation flux undergoes a change from a relatively large incident flux magnitude to a relatively small incident flux magnitude. In radiation detection systems, such as computed tomography systems, where a high degree of accuracy is required, these errors have proven to be extremely undesirable. Accordingly, a method for reducing the hysteresis and after-glow phosphorescence tail of the scintillation phosphor member utilized in a radiation detector, is highly desirable.

BRIEF SUMMARY OF THE INVENTION

In accordance with the invention, a member of scintillation phosphor, to be fabricated into a radiation detector, is irradiated by electrons to provide a scintillation detector having reduced hysteresis and after-glow phosphorescence tail.

In one presently preferred embodiment, wherein the scintillation phosphor is thallium-doped cesium iodide, the sensor scintillation member is irradiated with electrons having energy of about 1.5 meV. at dosages typically between about 50 mega-rads and about 800 mega-rads, and with the scintillation member being maintained at a temperature above room temperature and preferably within a range from about 100° C. to about 300° C. The electron irradiation processing may be followed by thermal annealing of the scintillation phosphor member, in an argon atmosphere.

Accordingly, it is an object of the present invention to provide a novel method for reducing the hysteresis and after-glow phosphorescence tail phenomena in a radiation detector of the scintillation phosphor type, by electron irradiation processing.

This and other objects of the present invention will become apparent upon consideration of the following detailed description, taken in conjunction with the drawings.

DETAILED DESCRIPTION OF THE INVENTION

Figure 1:
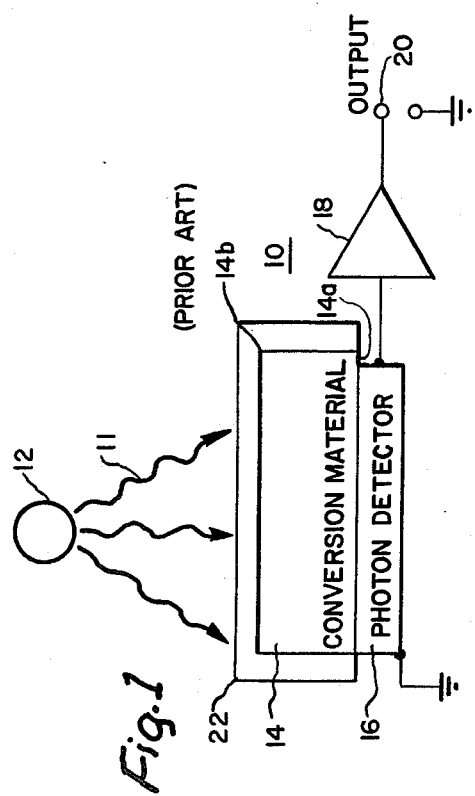
FIG. 1 is a schematic representation of a prior art radiation detection sensor and useful in understanding the principles of the present invention.

Referring initially to FIG. 1, a prior art radiation sensor 10, for detecting radiation 11 from a source 12, utilizes a member 14 of a material converting the radiation quanta impingent thereon to optical photons. The photons are emitted from a surface of member 14, e.g. back surface 14a opposite a front surface 14b upon which surface radiation quanta 11 impinge. A photon detector 16 is positioned adjacent to the surface 14a from which the optical photons are emitted and absorbs the optical photons for conversion to an electric current having a magnitude responsive to the magnitude of the photon flux. The output of photon detector 16 is coupled to an amplifier 18 for providing an electrical output, at terminal 20, responsive in magnitude to the magnitude of the flux of radiation quanta 11 incident upon the sensor. Advantageously, the surfaces of scintillation member 14 not adjacent to photon detector 16 are covered by a thin layer 22 of an optically reflective material having relatively low attenuation to radiation quanta 11.

Phonton detector 16 may be any photosensor, such as a photomuliplier and the like, sensitive to the optical photons. Preferably, photon detector 16 includes at least one phototransistor or photodiode, and scintillation member 14 is formed of a scintillation phosphor, such as thallium-doped cesium iodide (CsI:Tl), sodium-doped cesium iodide (CsI:Na), thallium-doped sodium iodide (NaI:Tl) and the like. Preferably, the CsI:Tl scintillation phosphor is utilized, as CsI:Na and NaI:Tl are both hydroscopic and tend to suffer internal damage with prolonged exposure to moisture. The CsI:Tl phosphor is stable in air up to 90% humidity, before local surface damage occurs. Further, use of relatively simple coatings, such as a plastic-based paint, tends to seal the thallium-doped cesium iodide phosphor member against even 100% humidity. The CsI:Tl phosphor is an excellent absorbed for X-ray quanta in the medical energy range, up to about 120 kVp. as may be required for radiation detector use in a computed tomography system, wherein sensor 10 receives pulses of radiation quanta 11, typically at a pulse rate of 60 pulses per second.

Figure 3:
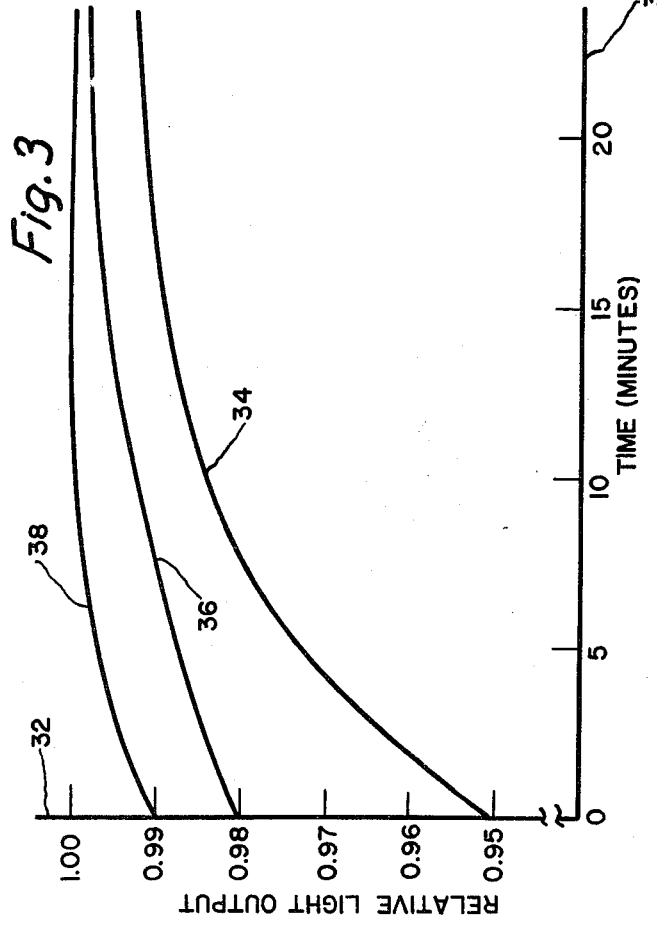
FIG. 3 is a graph illustrating the hysteresis phenomena in sensors using scintillation phosphor members having various forms of processing applied thereto, including the processing method of the present invention.

The use of high energy radiation, particularly for medical purposes, generally requires as short an exposure of the patient as possible. Maximum information during an exposure requires that, for passage of the radiation quanta through identically-attenuating objects, proportional magnitude outputs be obtained. It has been found that the output of sensor 10 experiences a time-related change in output, with essentially constant radiation quanta input, due to a change in the relative optical photon output of the scintillation phosphor of member 14. Referring to FIG. 3, increasing values of time, after commencement of radiation quanta impingement upon sensor 10, are plotted along abscissa 30, and increasing values of relative optical photon output are plotted along ordinate 32. A first curve 34 illustrates the time-dependent hysteresis effect, wherein the optical photon (light) output of the member of scintillation phosphor material is, at the initiation of X-ray excitation, about 95% of the optical photon output magnitude achieved after constant X-ray excitation for a relatively long time interval, e.g. greater than 40 minutes. It will be seen that the greatest relative optical photon output changes, in a bar of unprocessed CsI:Tl, occur in the first few minutes after X-ray excitation commences. Typically, curve 34 has a time constant on the order of eight minutes. A relaxation time constant of similar magnitude, is also observed, whereby, if X-ray excitation of the sensor is removed for a sufficiently long time interval, as occurs in changing patients or parameters in a computed tomography apparatus, the scintillation phosphor relative optical photon output returns along curve 34 to the relative output value of about 95% of the long-term, constant-excitation output value. These hysteresis effects are sources of undesirable error.

Figure 4:
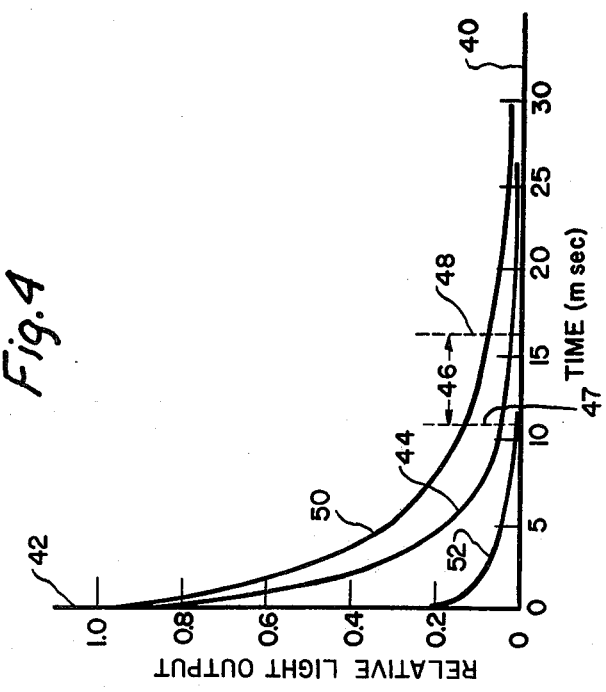
FIG. 4 is a graph illustrating the after-glow phosphorescence tail phenomena in sensors using scintillation phosphor members having various degrees of processing applied thereto, including the processing method of the present invention.

A second undesirable phenomenon occurs when the pulsed radiation excitation interval ceases. As seen in FIG. 4, increasing values of time, in milli-seconds after radiation pulse cessation, are plotted along abscissa 40 and increasing values of relative optical photon output, from scintillation phosphor member 14, are plotted along ordinate 42. A first curve 44 is found for the after-glow (or phosphorescent tail) phenomenon, which appears related to the non-uniform incorporation of the activator (thallium in the case of CsI:Tl), or other defects or impurities, in the phosphor material member. Curve 44, illustrating the after-glow following the third of three X-ray pulses at 60 Hz. and 90 kVp., wherein the tail appears to have a time constant on the order of 4 milli-seconds, for a radiation sensor 10 fabricated with untreated CsI:Tl scintillation phosphor.

When utilized in apparatus wherein a relatively large magnitude radiation flux signal is immediately followed by a relatively small magnitude flux signal, and wherein the magnitude of the signal at output 20 of the sensor is sampled with a sampling time interval on the order of 5 milli-seconds (for a 60 Hz pulse source) a double sampling, or auto-reset, method may be utilized wherein the first sample is taken during the presence of the pulse and a second sample, for establishing a sensor output zero reference (to be set before the next subsequent pulse) is taken after the cessation of a pulse, the second sample may occur in the time interval 46 between about 11 milli-seconds (broken line 47) and about 17 milli-seconds (broken line 48) after the end of the first sample. It will be seen, by reference to FIG. 4, that the sensor output during time interval 46 is a non-zero value, which value (the auto-reset zero reference value) may vary by several percent of the maximum relative optical photon output value during the time interval 46 of possible second samplings. Deleterious effects on the quality of the final computed tomography picture may be engendered by this "shift" in the zero reference signal.

Conversion material member 14 is advantageously annealed as by heating for about seven hours at a temperature of about 575° C. in an argon atmosphere. The annealing takes place with member 14 so positioned in the annealing furnace as to have a "zero" temperature gradient, to prevent sublimation of the samples, and with the member being subsequently slowly cooled as by turning off the power to the furnace, until the furnace and the conversion material members contained therein reach ambient temperature. Annealing of the conversion material member decreases the hysteresis of the sensor, as shown by curve 36 of FIG. 3, wherein the relative optical photon output has only a 2% change between the value thereof at the initiation of radiation flux incident upon the detector (after a long period of non-incidence) and a final relative optical photon (light) output value, measured after at least 20 minutes of continuous radiation flux impingement. The annealed scintillation phosphor member appears to have a time constant greater than 1 hour, and has the reversible hysteresis effect, wherein the sensor output returns to the lower relative light output level at initiation of radiation flux conversion, after relatively long periods of non-incidence of the radiation flux. However, the phosphorescence tail phenomenon, shown by curve 50 of FIG. 4, illustrates that the annealing process step generates an after-glow of greater magnitude and time constant (typically on the order of 6 milli-seconds, compared to the time constant on the order of 4 milli-seconds for the unannealed scintillation phosphor member). Thus, while annealing reduces the hysteresis of the sensor, the after-glow phosphorescent tail phenomena is increased and may result in changes as large as about 10% during the second sampling time interval 46 in auto-reset computed tomography apparatus.

Figure 2:
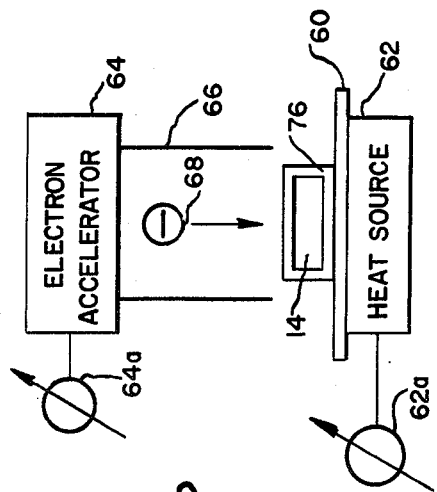
FIG. 2 is a schematic sideview illustrating the method of the present invention.

In accordance with the invention, I have found that both the hysteresis and phosphorescent tail phenomenon are both reduced by electron irradiation of the annealed member 14 of scintillation phosphor conversion material. Refering to FIG. 2, the scintillation phosphor conversion material member 14, after fabrication to the desired size, and optional preliminary annealing as hereinabove described, is placed upon a carrier 60, formed of highly heat-conductive material, and the carrier is placed upon a heat source 62, positioned below an electron accelerator 64. The phosphor member is positioned to have the beam 66 of electrons 68 impinge upon the entire top surface thereof when electron accelerator 64 is energized. Heat source 62 is adjusted, as by means of an associated control 62a, to raise the temperature of phosphor member 14 to a temperature above room temperature, and typically in the range from about 100° to about 300° C. The phosphor member 14 is advantageously enclosed in a thin wrapping of foil 76, of aluminum and the like, to prevent sublimation of the phosphor material while the member is at a temperature above room temperature. Foil covering 76 is of a thinness selected to allow electrons 68 to pass therethrough and irradiate member 14. The energy of electrons 68 of beam 66 is controlled, as by means of an adjustable control 64a associated with electron accelerator 64, whereby the electrons irradiating the preferred CsI:Tl phosphor member have an energy on the order of 1.5 meV. and the phosphor member is subjected to a desired total dosage, typically from about 50 mega-rads to about 800 mega-rads for CsI:Tl. Advantageously, the member receives one-half of the desired dosage while positioned with the first surface upward, and is then reversed, with front surface down, for irradiation of the remaining half of the dosage. A permanent change occurs in the material of member 14 which change reduces both the hysteresis and phosphor tail phenomenon. As shown by curve 38 in FIG. 3, the output of a sensor, utilizing a member 14 of electron-irradiated CsI:Tl conversion phosphor, has a hysteresis of about 1% between the relative light output value responsive to initial receipt of incident radiation flux after a long period of flux non-incidence, and the relative light output value observed after a long and continuous flux incidence interval. This hysteresis of approximately 1% is less than the approximately 2% hysteresis value observed for a sensor with phosphor member subject only to a thermal annealing, and to a 5% to 7% hysteresis value for a sensor utilizing a phosphor member which has not been either thermally annealed or electron irradiated.

As shown by curve 52 in FIG. 4, the phosphorescence tail of the relative light output of the sensor utilizing the thermally annealed and electron-irradiated phosphor member displays a short time constant, typically on the order of two milli-seconds (comparable to the 4 and 5 milli-second time constants, respectively, of the sensors utilizing unprocessed and thermally-annealed-only phosphor bars). Thus, the relative light output of sensor 10 utilizing an annealed and irradiated flux conversion member 14 has substantially zero magnitude during the second sampling time interval 46, whereby the auto-reset zero reference signal has, at most, a few tens of a percentage point difference for sampling at different times within the total second sampling interval 46.

Electron irradiation of annealed thallium-doped cesium iodide members does, however, cause color centers to be formed whereby the crystals acquire a pink to red color and the optical photon output of the conversion member is somewhat reduced. I have found that the output is reduced by about 10% for a total irradiation dosage on the order of 100 mega-rads, although a second thermal annealing tends to decrease the number of color centers formed and return the magnitude of optical photon output of the conversion member to the non-irradiated value thereof. It is believed that electron radiation forms "killer centers" which reduce the hysteresis and after-glow phenomenon and that introduction of transition-metal "killer centers" may provide like improvements.

While the present invention has been described with reference to a presently preferred embodiment, many modifications and variations will now occur to those skilled in the art. It is my intent, therefore, to be limited only by the scope of the pending claims and not by the specific preferred embodiment described herein.

What is claimed is:

1. A method for fabricating a sensor having an electrical output amplitude responsive to the amplitude of an incident radiation flux, comprising the steps of:
   (a) providing a member of a scintillator material characterized by emission of optical photons responsive to incidence of said radiation flux upon the member material;
   (b) then heating the member to a temperature above room temperature;
   (c) then irradiating the heated member with electrons;
   (d) then cooling the irradiated member to ambient temperature;
   (e) providing a photon detector; and
   (f) then finally assemblying the sensor by positioning the photon detector to receive the optical photon emissions of the previously irradiated member to form the electrical output of said sensor with amplitude responsive to each reception of the radiation flux subsequently incident upon said sensor after final assembly thereof.

2. The method as set forth in claim 1, wherein step (c) includes the step of subjecting the member to an irradiating dosage of between about 50 mega-rads and about 800 mega-rads.

3. The method as set forth in claim 2, wherein the total dosage is about 100 mega-rads.

4. The method as set forth in claim 2, wherein the electrons have an energy on the order of 1.5 meV.

5. The method as set forth in claim 1, further comprising the step of thermally annealing the member of flux-converting material prior to irradiation.

6. The method as set forth in claim 5, wherein the annealing step includes the steps of: placing the member in an argon atmosphere; heating the member to about 575° C. for a time interval of about 7 hours; and allowing the member to cool by radiation to room temperature before removal of the member from the argon atmosphere.

7. The method as set forth in claim 1, wherein step (b) includes the step of heating the member to a temperature between about 100° C. and about 300° C. during electron irradiation.

8. The method as set forth in claim 7, wherein step (b) further includes the step of enclosing the member in a foil enclosure during heating of the member.

9. The method as set forth in claim 1, further including the step of enclosing the surfaces of said member not emitting optical photons toward said photon detector with a coating of light-reflective material, prior to positioning the member with respect to the photon detector.

10. The method as set forth in claim 1, further including the step of thermally annealing the member after irradiation and prior to positioning the member with respect to the photon detector.

* * * * *